(12) United States Patent
McKay et al.

(10) Patent No.: US 7,138,093 B2
(45) Date of Patent: Nov. 21, 2006

(54) HEAT EXCHANGER DEVICE

(76) Inventors: Randy McKay, P.O. Box 1475, Beaverlodge, Alberta (CA) T0H 0C0; Robert Moncrieff, Box 394, Beaverlodge, Alberta (CA) T0H 0C0

( * ) Notice: Subject to any disclaimer, the term of this patent is extended or adjusted under 35 U.S.C. 154(b) by 372 days.

(21) Appl. No.: 10/614,186

(22) Filed: Jul. 8, 2003

(65) Prior Publication Data

US 2005/0008551 A1   Jan. 13, 2005

(51) Int. Cl.
*B01J 19/00* (2006.01)
*F27D 21/00* (2006.01)

(52) U.S. Cl. .................. 422/198; 432/31; 165/148; 165/149

(58) Field of Classification Search ............... 432/328, 432/329, 31, 32; 431/168; 422/198; 165/148, 165/149
See application file for complete search history.

(56) References Cited

U.S. PATENT DOCUMENTS

| | | | | |
|---|---|---|---|---|
| 3,720,188 A | * | 3/1973 | Mead | 122/41 |
| 3,784,353 A | * | 1/1974 | Chapurin | 431/329 |
| 3,818,884 A | * | 6/1974 | Pfender | 123/142.5 R |
| 3,857,669 A | * | 12/1974 | Smith et al. | 431/328 |
| 3,908,602 A | * | 9/1975 | Brulfert et al. | 122/4 D |
| 4,089,303 A | * | 5/1978 | Brulfert | 122/250 R |
| 4,204,829 A | * | 5/1980 | Kendall et al. | 431/7 |
| 4,617,870 A | * | 10/1986 | Hirano et al. | 110/323 |
| 4,658,762 A | * | 4/1987 | Kendall | 122/250 R |
| 4,813,396 A | * | 3/1989 | Sargeant et al. | 126/374.1 |
| 5,709,174 A | * | 1/1998 | Ledjeff et al. | 122/17.2 |
| 5,851,498 A | * | 12/1998 | Rozenshtein et al. | 422/211 |
| 5,921,769 A | * | 7/1999 | Lorek | 431/328 |
| 6,431,856 B1 | * | 8/2002 | Maenishi et al. | 431/328 |
| 6,712,601 B1 | * | 3/2004 | Cessac | 431/6 |
| 6,776,227 B1 | * | 8/2004 | Beida et al. | 166/61 |

OTHER PUBLICATIONS

CCI Thermal Technologies Cata-Dyne Heaters, www.ccithermal.com, Jul. 2003.*

* cited by examiner

*Primary Examiner*—N. Bhat
(74) *Attorney, Agent, or Firm*—Ryan W. Dupuis; Michael R. Williams; Adrian D. Battison

(57) ABSTRACT

A heat exchanger device is configured for use with a catalytic heater having a planar heat radiating surface. The device includes an inlet header, an outlet header and heat exchanger tubes communicating therebetween. A frame supports the headers and the heat exchanger tubes to extend across the heat radiating surface of the catalytic heater. The frame is particularly suited for being supported on a Cata-Dyne™ type heater.

16 Claims, 4 Drawing Sheets

HEAT EXCHANGER DEVICE

FIELD OF THE INVENTION

The present invention relates to a heat exchanger device for use with a catalytic heater, and more particularly relates to a system and method of heating using the heat exchanger device in co-operation with a catalytic heater having a heat radiating surface for transferring heat to fluid of the heat exchanger device for heating a target area with the heated fluid.

BACKGROUND

In colder climates, outdoor operating equipment in various industries are known to have difficulties due to freezing up of various fluid lines of the equipment. For instance in propane and natural gas industries freeze up is known to occur on production lines, fuel gas lines, instrumentation, drains, vent lines, storage tank load lines and many other related situations. Various types of heaters are known in the industry, however none are particularly suited for exchanging heat between conventional heaters and fluid lines.

SUMMARY

According to one aspect of the present invention there is provided a heat exchanger device for use with a catalytic heater having a heat radiating surface, the device comprising:

an inlet header and an outlet header, each for receiving heat exchanger fluid therethrough;

at least one heat exchanger tube for communicating the heat exchanger fluid between the inlet header and the outlet header; and a frame for supporting the headers and said at least one heat exchanger tube on the catalytic heater such that said at least one heat exchanger tube extends across the heat radiating surface of the catalytic heater.

The use of a heat exchanger which couples to known catalytic heaters allows heat transfer to fluid lines in various industries to prevent freeze up in an efficient manner. The particular location of the heat exchanger tubes extending across the heat radiating surface of the heater provides considerable efficiency in heating fluid lines.

The frame is preferably arranged to support the inlet and outlet headers also to span the heat radiating surface of the catalytic heater.

A plurality of heat exchanger tubes preferably communicate between the inlet and outlet headers.

A pump may be provided for circulating the heat exchanger fluid. The pump in this instance includes an inlet coupled to the outlet header and an outlet coupled to the inlet header.

There may be provided a surge tank communicating between the pump outlet and the inlet header. The surge tank is preferably spaced above communication of itself with the inlet header for gravity feeding fluid from the tank to the inlet header.

The surge tank may include a vent for maintaining the surge tank at atmospheric pressure.

The inlet header preferably includes an inlet opening for receiving the heat exchanger fluid adjacent a bottom end of the device while the outlet header preferably includes an outlet opening for releasing the heat exchanger fluid adjacent a top end of the device.

There may be provided a probe of heat conductive material supported for communication with the heat exchanger fluid passing through the device which couples to a thermostatic element of the catalytic heater.

There may be provided a temperature gage in communication with heat exchanger fluid adjacent both the inlet header and the outlet header for visually monitoring temperature of the fluid.

According to a second aspect of the present invention there is provided a heating system comprising a catalytic heater having a heat radiating surface and a heat exchanger comprising:

an inlet header and an outlet header, each for receiving heat exchanger fluid therethrough;

at least one heat exchanger tube communicating between the inlet header and the outlet header; and a frame supporting the headers and said at least one heat exchanger tube on the catalytic heater such that said at least one heat exchanger tube extends across the heat radiating surface of the catalytic heater;

and a fluid circulating system for circulating the heat exchanger fluid through the heat exchanger and a target area to be heated.

The heat exchanger preferably spans substantially the entire heat radiating surface of the heater.

When the heater includes a thermostatic control having a thermostatic element, the element is preferably in communication with the heat exchanger fluid adjacent the inlet header.

There may be provided a pump for circulating the heat exchanger fluid including an inlet coupled to the outlet header and an outlet coupled to the inlet header.

The frame may include a generally rectangular housing supporting the headers and said at least one heat exchanger tube therein, the housing being coupled to the catalytic heater by threaded fasteners for securement to a conventional catalytic heater. The frame of the heat exchanger is preferably similar in dimensions to the heat radiating surface of the catalytic heater.

According to a further aspect of the present invention there is provided a method of heating a target area comprising:

providing a catalytic heater having a heat radiating surface;

providing a heat exchanger having an inlet header, an outlet header and at least one heat exchanger tube communicating between the inlet header and the outlet header;

supporting said at least one heat exchanger tube to extend across the heat radiating surface of the catalytic heater; and circulating heat exchanger fluid through the heat exchanger and the target area.

The method may include connecting a thermostat operating the catalytic heater to the heat exchanger in communication with the heat exchanger fluid circulated therethrough.

When heat radiating surface lies in a radiating plane of the heater, the method preferably includes providing a plurality of heat exchanger tubes to span substantially the entirety of the heat radiating surface of the catalytic heater parallel to the radiating plane of the heater.

The method may include providing a surge tank in communication with the inlet header; pumping the heat exchanger fluid from the outlet header, through the target area, to the surge tank; locating the surge tank above communication of the surge tank with the inlet header; and venting the surge tank to atmospheric pressure.

The catalytic heater preferably comprises a Cata-Dyne™ heater.

BRIEF DESCRIPTION OF THE DRAWINGS

In the accompanying drawings, which illustrate an exemplary embodiment of the present invention.

DETAILED DESCRIPTION

Figure 1:
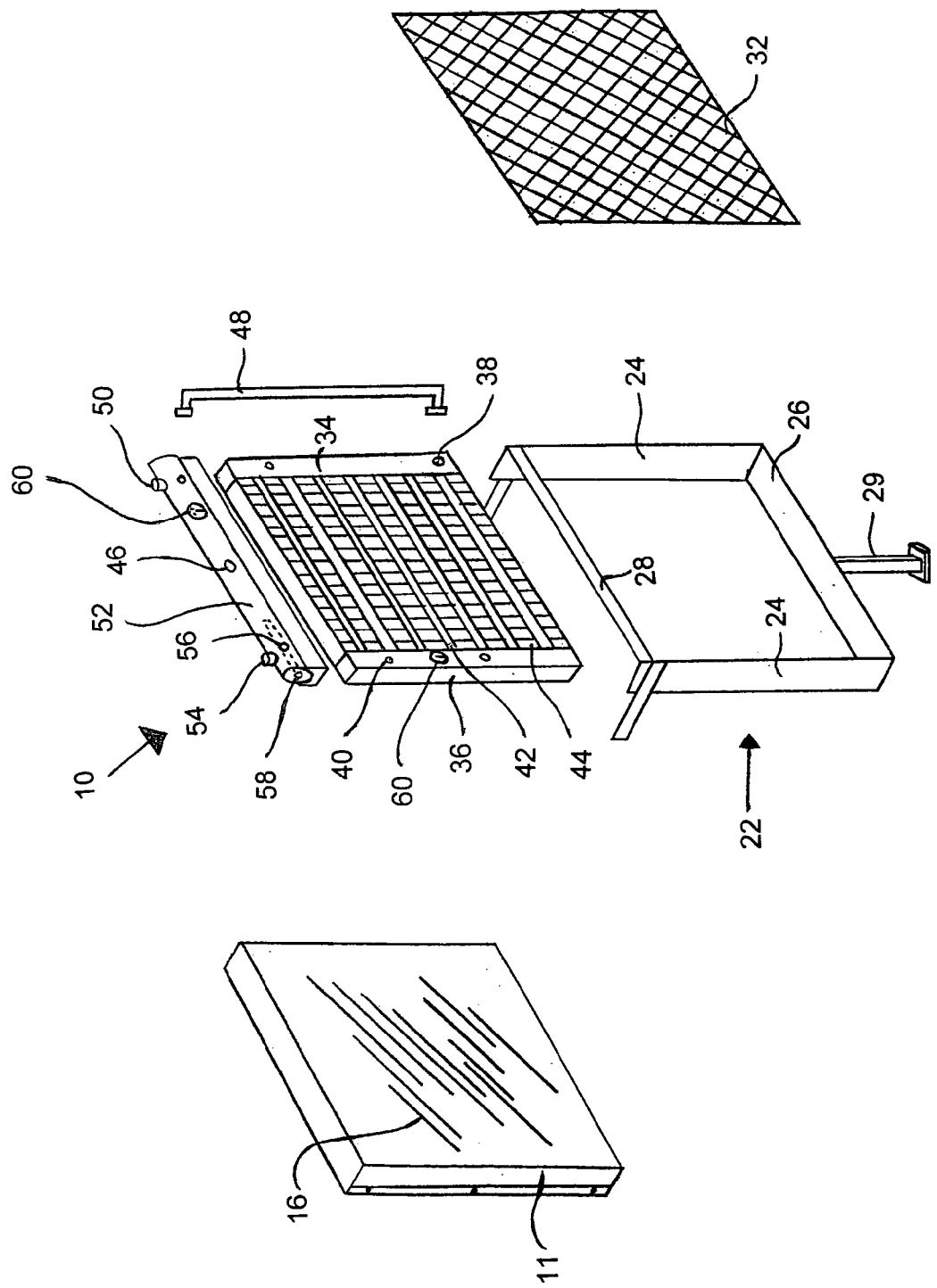
FIG. 1 is a partially exploded perspective view of the heat exchanger before it is mounted on a catalytic heater.
Figure 2:
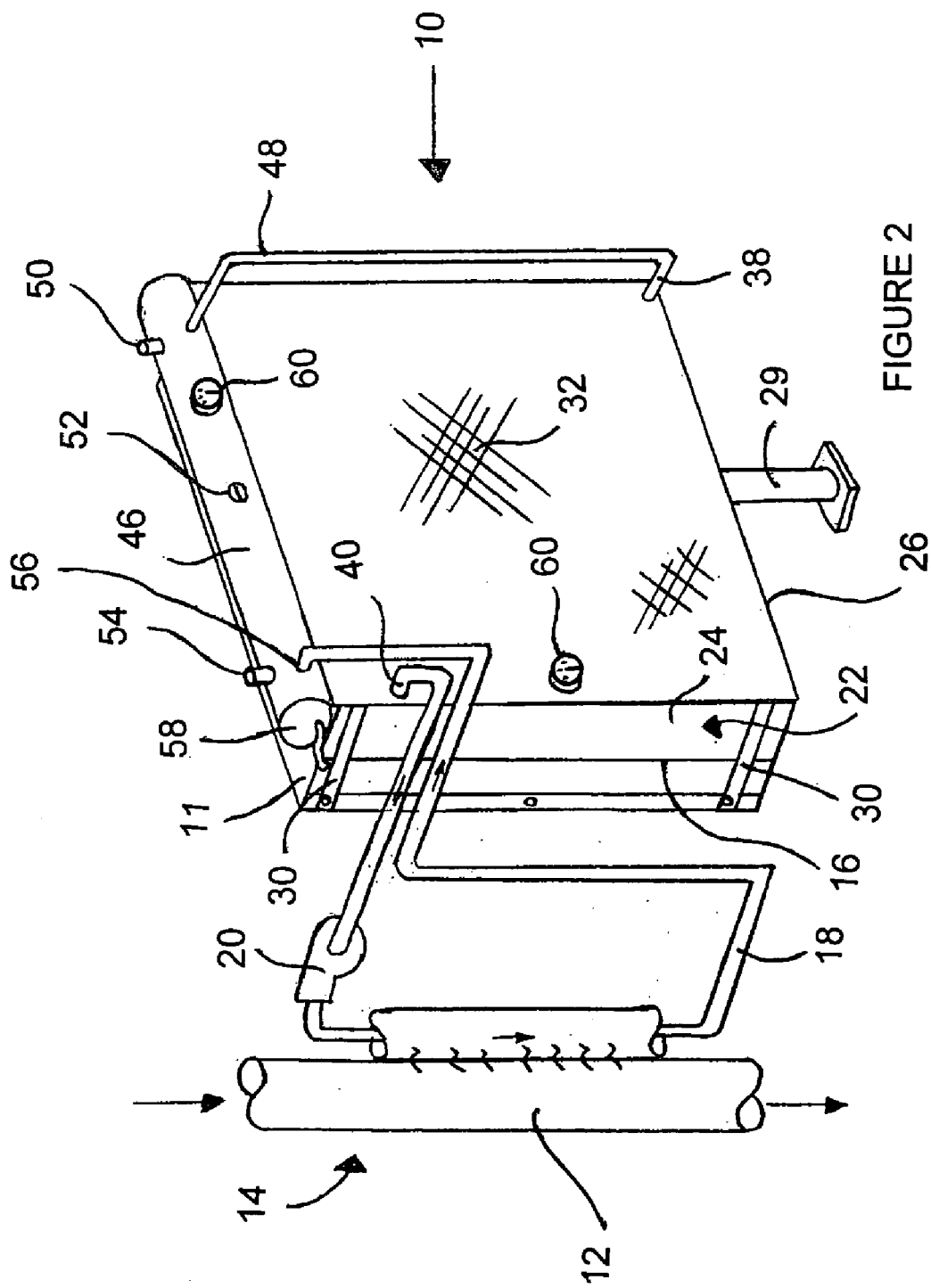
FIG. 2 is a perspective view of the assembled components of the heat exchanger attached to the catalytic heater.
Figure 3:
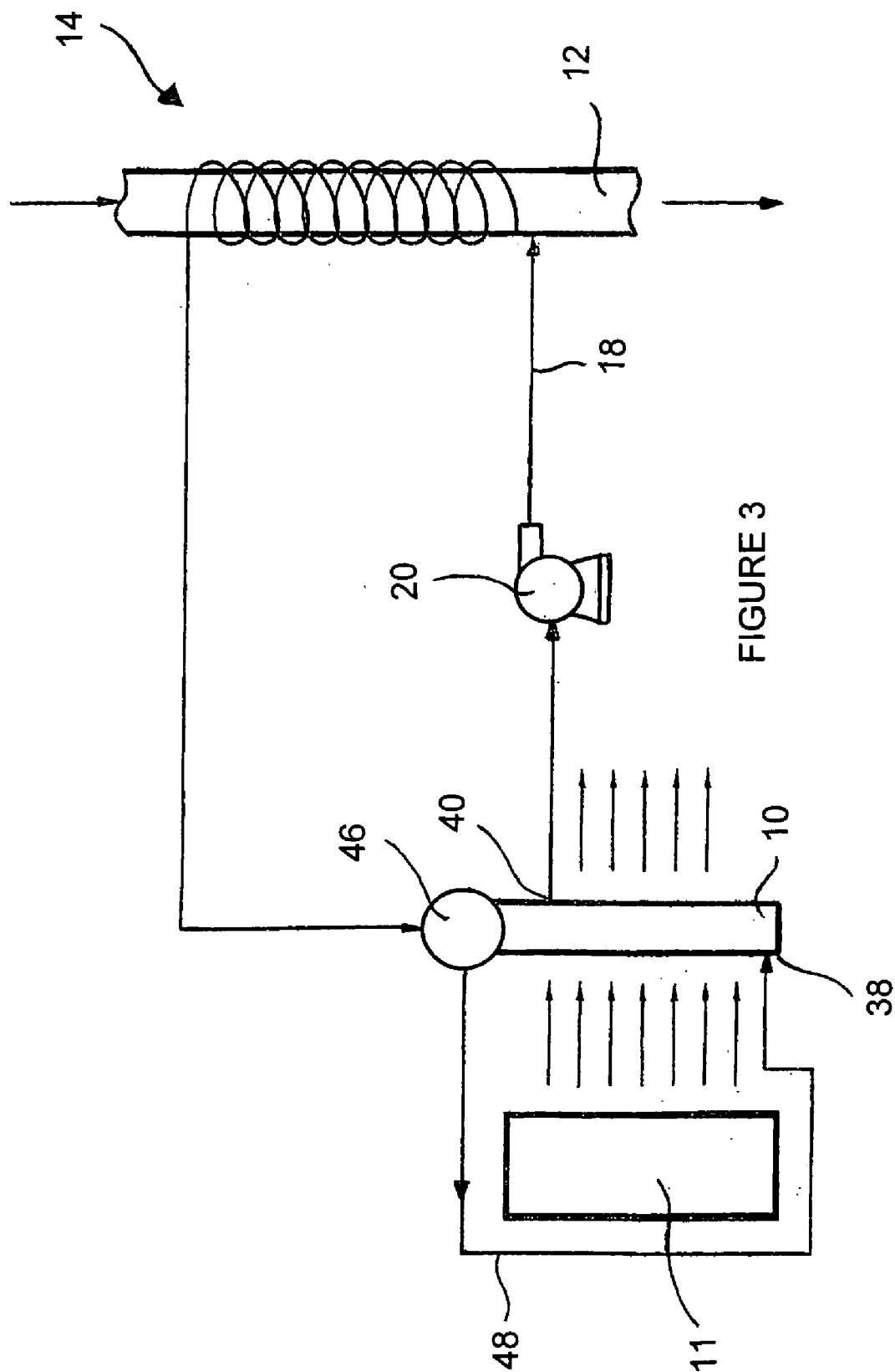
FIG. 3 is a schematic view of the process using the heat exchanger.
Figure 4:
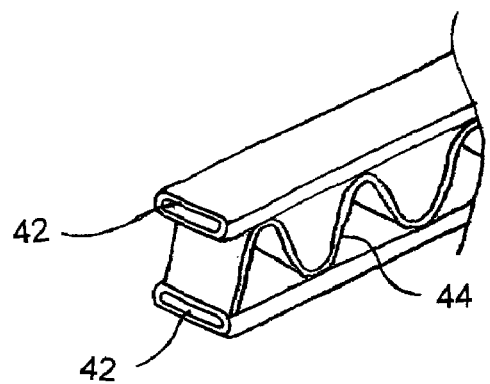
FIG. 4 is a perspective view of a heat exchanger tube of the exchanger.
Figure 5:
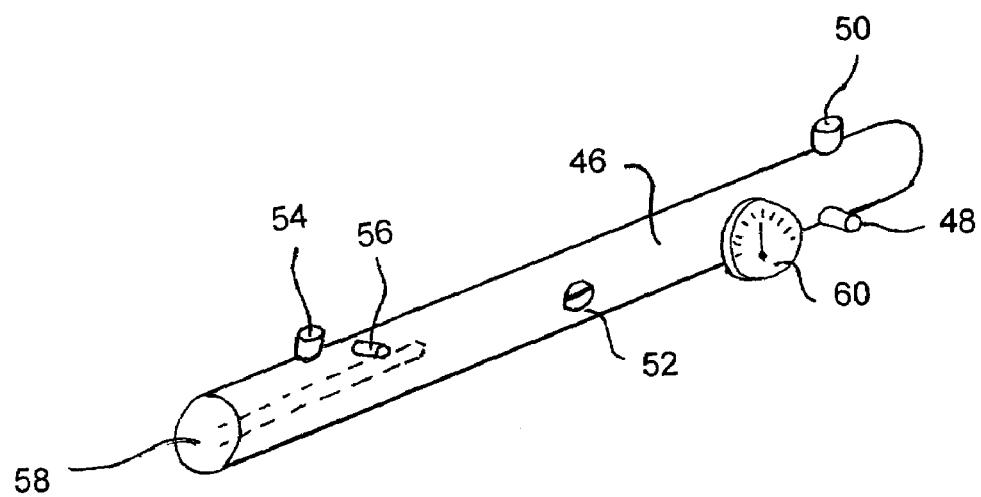
FIG. 5 is a perspective view of the surge tank of the heat exchanger.

Referring to the accompanying drawings, there is illustrated a heat exchanger generally indicated by reference numeral 10. The exchanger 10 is particularly useful for transferring heat from a catalytic heater 11 to process fluid pipes 12 in a target area 14.

The catalytic heater generally comprises a heater which is available under the name Cata-Dyne™ from CCI Thermal Technologies having a head office located in Edmonton, Canada. The heater 14 includes a catalyst pad supplied with propane or natural gas for catalytic combustion thereof to produce heat in the form of infra red energy emitted from a heat radiating surface 16 of the catalyst pad which is generally rectangular and lies in a flat heat radiating plane.

The process fluid in the pipe 12 to be heated may include oil and gas production or exploration equipment, petrol chemical storage and distribution equipment, propane or compressed natural gas facilities or other generally industrial areas. Freeze up on colder climates can thus be prevented on production lines, fuel gas lines, instrumentation and the like. The resulting increase in equipment safety and reliability reduces down time, truckers loading time and operating time.

The heat exchanger 10 is part of a heating system which includes heat exchanging tubing 18 formed of a material of high heat conduction which surrounds the pipe 12 in sufficiently close proximity for efficiently transferring heat therebetween. The heat exchanging tubing 18 connects to the heat exchanger 10 to receive heat exchanger fluid therefrom to be fed into the inlet of a pump 20. The tubing 18 then conducts the fluid from the pump outlet to the pipes 12 of the process fluid before again connecting to the exchanger so that the heat exchange fluid can re-enter the exchanger. Appropriate fluids for the heat exchanger fluid may include glycol or other similar fluids commonly referred to as anti-freeze having a freezing point below that of water.

The exchanger 10 includes an outer frame 22 in the form of a generally rectangular housing for receiving the working components of the exchanger therein. The frame includes two side members 24 and a bottom member 26 positioned about the rectangular periphery of the housing and a front strap 28 spanning between the side members 24 at the top end of the exchanger. The outer frame 24 surrounds rectangular openings on the front and back surfaces of the heat exchanger. The openings are each generally rectangular and suitably sized for matching the surface area of the heat radiating surface of the heater 11.

The frame 22 further includes a post 29 connected to the bottom member 26 to extend downwardly therefrom for supporting the frame spaced above the ground. A pair of mounting straps 30 are secured to respective side members 24 to project rearwardly therefrom at both top and bottom ends of the heater. Each of the mounting straps 30 is suitably configured with mounting apertures therein for bolting to the heater using existing fasteners or mounts of the casing of the heater 11. A protective screen 32 is also provided which spans the opening at the front face of the exchanger for providing a protective cage to enclose the working components of the exchanger therein.

The working components of the exchanger include an inlet header 34 and an outlet header 36. Each of the headers comprises a vertically oriented chamber which is mounted adjacent a respective side member 24 of the frame so that the headers are spaced apart on opposing sides of the exchanger from one another and each span the heat radiating surface of the heater 11 in the mounted position between the top and bottom ends thereof. Each header comprises an enclosed tank for receiving and communicating heat exchanging fluid therethrough. The inlet header 34 includes an inlet opening 38 for receiving the heating fluid therethrough located on a front face of the heat exchanger while the outlet header 36 includes an outlet opening 40 adjacent a top end thereof also on the front face of the heat exchanger for emitting the heat exchanging fluid therefrom.

A plurality of heat exchanging tubes 42 are provided which span in communication between the inlet header and the outlet header so as to span across the heat radiating surface of the catalytic heater 11 in the mounted position of the heat exchanger with all of the tubes 42 lying parallel to one another and the heat radiating plane of the heater. The tubes 42 are spaced apart from one another and formed of a material of high heat conduction with fins in close proximity to one another also spanning between adjacent tubes to conduct the heat away from the tubes with the fins 44 similarly being formed of a material with a high heat conduction. The headers and the tubes 42 are arranged to lie in a generally common plane parallel to the heat radiating plane of the heater and are positioned to span substantially the entire heat radiating surface due to the working components of the heat exchanger being suitably sized to match the heat radiating surface of the heater.

A surge tank 46 is provided which spans along a top edge of the heat exchanger a length which is approximately equal to the spacing between the headers. The surge tank is a sealed tubular chamber which communicates with a feed tube adjacent a bottom end of the tank at an end of the tank nearest to the inlet header to the inlet header at the inlet opening thereof adjacent the bottom end. The feed tube 48 permits fluid in the surge tank to be fed into the bottom of the inlet header by gravity.

The surge tank further includes a fill port which provides an opening to permit heat exchanging fluid to be added into the heating system therethrough as required. A sight glass 52 is provided on the surge tank to provide a visual indication to an operator if sufficient fluid levels are in the surge tank to determine if fluid need be added through the fill port 50. A vent 54 is also provided on the surge tank which vents the surge tank to atmosphere so that the surge tank remains at atmospheric pressure therein.

An inlet 56 on the surge tank receives fluid from the discharge of the pump 20 to refill the tank as the tank drains into the inlet header in use.

A probe 58 of heat conductive material extends into the tank for receiving the thermostatic element of a thermostatic control of the heater 11 therein in use so that the heater control of the heater 11 communicates with the heat exchanger fluid in the tank. Temperature gauges 60 are provided in communication with the heat exchanger fluid passing through the heat exchanger in the tank 46 adjacent the inlet header and at the outlet header so that temperature can be monitored before and after the heat exchanger fluid has passed through the heat exchanger.

In use, the heat in the form of infrared energy radiated from a catalytic heater 11 can be captured and used for heating fluid in process pipes 12 by providing a heat exchanger of the type described herein. The exchanger includes a frame 20 as noted above which can be coupled to the outer casing of an existing catalytic heater using threaded fasteners. A plurality of heat exchanger tubes 42 are thus positioned to span across the heat radiating surface of the heater 11. The pump 20 is operated to reduce pressure in the tubing connecting the inlet of the pump to the outlet header so that the reduction in pressure in the outlet header causes atmospheric pressure in the surge tank and gravity to force fluid through the feed tube 48 to the bottom of the inlet header 34. The fluid then continues to flow upwardly through the inlet header and across the heat exchanger tubes 42 to the outlet header to be pumped by the pump 20 through the heat exchanger tubing 18 in communication with the fluid in the process pipes 12. Positive pressure from the pump causes the heat exchanger fluid to continue to flow into the surge tank 46 at atmospheric pressure. As the pump continues to operate the fluid continues to be circulated through the heat exchanger and the exchanger tubing 18 surrounding the fluid pipes 12. The heater 11 includes a thermostatic control which couples to the probe 58 to monitor temperature of the heat exchanger fluid returning to the heat exchanger in the surge tank so that the heater is only activated when the fluid circulating through the heat exchanger requires heating due to a low temperature being recorded by the probe 58.

While one embodiment of the present invention has been described in the foregoing, it is to be understood that other embodiments are possible within the scope of the invention. The invention is to be considered limited solely by the scope of the appended claims.

The invention claimed is:

1. A heat exchanger device for use with a catalytic heater having a heat radiating surface, the device comprising:
    a heat exchanger comprising an inlet header and an outlet header, each for receiving heat exchanger fluid therethrough, and at least one heat exchanger tube for communicating the heat exchanger fluid between the inlet header and the outlet header;
    a frame for supporting the headers and said at least one heat exchanger tube on the catalytic heater such that said at least one heat exchanger tube extends across the heat radiating surface of the catalytic heater;
    heat exchanger tubing for communicating between the headers and a target area to be heated;
    a pump for circulating the heat exchanger fluid through the headers and the heat exchanger tubing, the pump being connected in series with the heat exchanger tubing directly between the outlet header of the heat exchanger and the target area for pumping from the heat exchanger to the target area; and
    a surge tank at atmospheric pressure, spanning a top of the heat exchanger and communicating in series with the inlet header through a feed tube from the surge tank to the inlet header, for receiving heat exchanger fluid from the target area and for supplying heat exchanger fluid directly to the inlet header by gravity feed.

2. The device according to claim 1 wherein the frame is arranged to support the inlet and outlet headers to span the heat radiating surface of the catalytic heater.

3. The device according to claim 1 wherein there is provided a plurality of heat exchanger tubes communicating between the inlet and outlet headers.

4. The device according to claim 1 wherein the surge tank includes a vent for maintaining the surge tank at atmospheric pressure.

5. The device according to claim 1 wherein the inlet header includes an inlet opening for receiving the heat exchanger fluid adjacent a bottom end of the device and the outlet header includes an outlet opening for releasing the heat exchanger fluid adjacent a top end of the device.

6. The device according to claim 1 wherein there is provided a probe of heat conductive material supported for communication with the heat exchanger fluid passing through the device, the probe being arranged to be coupled to a thermostatic element of the catalytic heater.

7. The device according to claim 1 wherein there is provided a temperature gage in communication with heat exchanger fluid adjacent both the inlet header and the outlet header.

8. A heat exchanger device in combination with a catalytic heater having a heat radiating surface and a thermostatic control; the heat exchanger device comprising:
    a heat exchanger comprising an inlet header and an outlet header, each for receiving heat exchanger fluid therethrough, and at least one heat exchanger tube communicating between the inlet header and the outlet header;
    a frame supporting the headers and said at least one heat exchanger tube on the catalytic heater such that said at least one heat exchanger tube extends across the heat radiating surface of the catalytic heater;
    a pump for circulating the heat exchanger fluid through the headers and the heat exchanger tubing, the pump being connected in series with the heat exchanger tubing directly between the outlet header of the heat exchanger and the target area for pumping from the heat exchanger to the target area;
    a surge tank at atmospheric pressure and communicating in series with the inlet header for receiving heat exchanger fluid from the target area and for supplying heat exchanger fluid directly to the inlet header by gravity feed; and
    a temperature probe operatively connected with the thermostatic control of the catalytic heater, the probe being supported in communication with the heat exchanger fluid in the surge tank.

9. The device according to claim 8 wherein the heat exchanger spans substantially the entire heat radiating surface of the heater.

10. The device according to claim 8 wherein there is provided a pump for circulating the heat exchanger fluid including an inlet coupled to the outlet header and an outlet coupled to the inlet header.

11. The device according to claim 8 wherein the frame includes a generally rectangular housing supporting the headers and said at least one heat exchanger tube therein, the housing being coupled to the catalytic heater by threaded fasteners.

12. The device according to claim 11 wherein the frame of the heat exchanger is similar in dimensions to the heat radiating surface of the catalytic heater such that the headers are supported along opposing sides of the heat radiating surface and said at least one heat exchanger tube spans between the headers in a generally common plane with the headers.

13. A method of heating a target area using a catalytic heater having a heat radiating surface, the method comprising:
   providing a heat exchanger having an inlet header, an outlet header and at least one heat exchanger tube communicating between the inlet header and the outlet header;
   supporting said at least one heat exchanger tube to extend across the heat radiating surface of the catalytic heater;
   providing a surge tank in communication with the inlet header and receiving heat exchanger fluid directly from the target area;
   locating the surge tank to span the top of the heater exchanger;
   venting the surge tank to atmospheric pressure;
   supplying heat exchanger fluid to the inlet header from the surge tank at atmospheric pressure by gravity feed through a feed tube extending from the surge tank to the inlet header;
   pumping the heat exchanger fluid directly from the outlet header of the heat exchanger to the target area.

14. The method according to claim 13 including connecting a thermostat operating the catalytic heater to the heat exchanger in communication with the heat exchanger fluid in the surge tank.

15. The method according to claim 13 wherein the heat radiating surface lies in a radiating plane of the heater and wherein the method includes providing a plurality of heat exchanger tubes to span substantially the entirety of the heat radiating surface of the catalytic heater parallel to the radiating plane of the heater.

16. The method according to claim 13 including locating the surge tank to span a top side of the heat exchanger.

* * * * *